United States Patent [19]

Schaetzer

[11] Patent Number: 5,288,858
[45] Date of Patent: Feb. 22, 1994

[54] DIAZO DYES CONTAINING A HYDROXY ALKOXYBENZENE MIDDLE COMPONENT AND A PYRAZOLE COUPLING COMPONENT

[75] Inventor: Jürgen Schaetzer, Rheinfelden, Fed. Rep. of Germany

[73] Assignee: Ciba-Geigy Corporation, Ardsley, N.Y.

[21] Appl. No.: 914,176

[22] Filed: Jul. 14, 1992

[30] Foreign Application Priority Data

Jul. 19, 1991 [CH] Switzerland ............... 2161/91

[51] Int. Cl.$^5$ ............... C09B 31/147; D06P 3/24
[52] U.S. Cl. ............... 534/756; 534/586; 534/590; 534/764; 8/641; 8/917; 8/924; 8/929
[58] Field of Search ............... 534/756, 764, 586, 590; 8/641, 917, 924, 929

[56] References Cited

U.S. PATENT DOCUMENTS

| | | | |
|---|---|---|---|
| 3,066,134 | 11/1962 | Gangneux et al. | 534/764 |
| 3,900,460 | 8/1975 | Dehnert | 534/764 |
| 4,579,561 | 4/1986 | Rowe | 8/641 |
| 4,749,784 | 6/1988 | Feeman | 534/728 |
| 5,196,520 | 3/1993 | Schaetzer | 534/756 |

FOREIGN PATENT DOCUMENTS

| | | |
|---|---|---|
| 0439423 | 7/1991 | European Pat. Off. |
| 4031650 | 4/1991 | Fed. Rep. of Germany |
| 1213760 | 4/1960 | France |
| 2030380 | 11/1970 | France |
| 2024265 | 1/1980 | United Kingdom |

OTHER PUBLICATIONS

Lange et al., *CHemical Abstracts*, 58:1566c (1963).

*Primary Examiner*—Mary C. Lee
*Assistant Examiner*—Fiona T. Powers
*Attorney, Agent, or Firm*—Kevin T. Mansfield; Edward McC. Roberts

[57] ABSTRACT

The invention relates to azo dyes of the formula

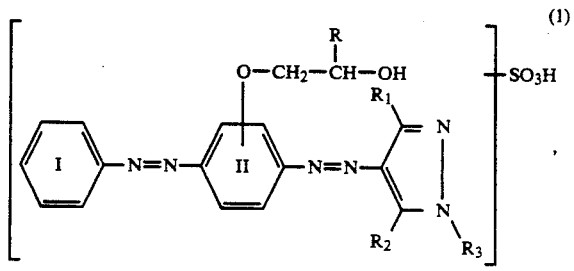

in which R, $R_1$ and $R_2$, independently of one another, are hydrogen, substituted or unsubstituted $C_1$–$C_8$alkyl or phenyl, $R_3$ is hydrogen or substituted or unsubstituted $C_1$–$C_8$alkyl, $C_5$–$C_7$cycloalkyl or phenyl and the benzene rings I and II may be further substituted.

The azo dyes are suitable for the dyeing or printing of natural or synthetic polyamide fibre materials, in particular in combination with other dyes and in particular from short liquors. The azo dyes are distinguished by generally good properties, in particular good affinity.

15 Claims, No Drawings

DIAZO DYES CONTAINING A HYDROXY ALKOXYBENZENE MIDDLE COMPONENT AND A PYRAZOLE COUPLING COMPONENT

The present invention relates to novel azo dyes, processes for their preparation and the use of these dyes for the dyeing and printing of fibre materials, in particular textile fibre materials.

The present invention relates to azo dyes of the formula

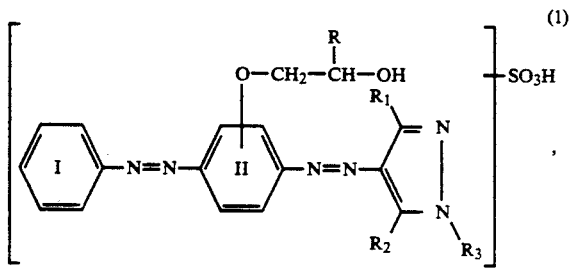

in which R, $R_1$ and $R_2$, independently of one another, are hydrogen, substituted or unsubstituted $C_1$–$C_8$alkyl or phenyl, $R_3$ is hydrogen or substituted or unsubstituted $C_1$–$C_8$alkyl, $C_5$–$C_7$cycloalkyl or phenyl and the benzene rings I and II may be further substituted.

The azo dyes of the formula (1) in which $R_1$ and $R_2$ have meanings which are different from one another and in addition $R_3$ is not hydrogen are usually present as a mixture of isomeric compounds of the formulae

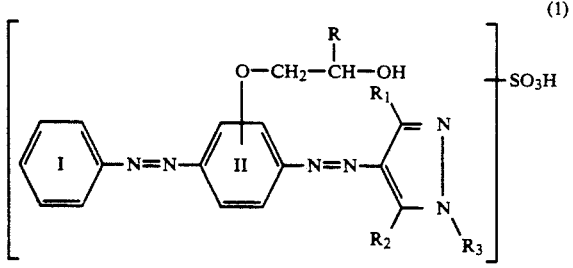

and

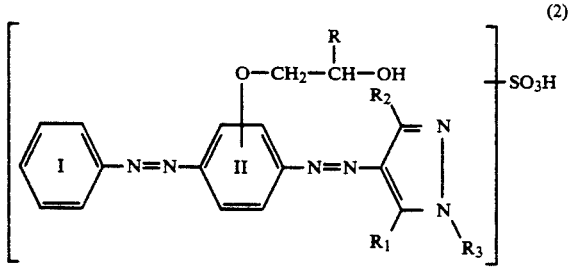

The designation azo dyes of the formula (1) is understood here and hereinafter also to include the abovementioned mixtures of isomers.

Examples of R, $R_1$, $R_2$ and $R_3$ in formula (1) as $C_1$–$C_8$alkyl are, independently of one another, methyl, ethyl, propyl, isopropyl, butyl, isobutyl, sec-butyl, tert-butyl, pentyl, hexyl, heptyl or octyl, and the corresponding radicals which are substituted, for example, by hydroxyl, $C_1$–$C_4$alkoxy, cyano or halogen. R as substituted $C_1$–$C_8$alkyl is in particular hydroxyl-substituted $C_1$–$C_8$alkyl.

Examples of $R_3$ in formula (1) as $C_5$–$C_7$cycloalkyl are unsubstituted cyclohexyl or cyclohexyl substituted by $C_1$–$C_4$alkyl, for example methyl or ethyl.

Examples of R, $R_1$, $R_2$ and $R_3$ in formula (1) as phenyl are unsubstituted phenyl or phenyl substituted by $C_1$–$C_4$alkyl, for example methyl or ethyl, $C_1$–$C_4$alkoxy, for example methoxy or ethoxy, $C_2$–$C_4$alkanoylamino, for example acetylamino or propionylamino, hydroxyl, sulfo or halogen, for example fluorine, chlorine or bromine.

Examples of substituents of benzene rings I and II are, independently of one another, $C_1$–$C_4$alkyl, for example methyl or ethyl, $C_1$–$C_4$alkoxy, for example methoxy or ethoxy, $C_2$–$C_4$alkanoylamino, for example acetylamino or propionylamino, hydroxyl, sulfo, nitro, halogen, for example fluorine, chlorine or bromine, sulfamoyl or sulfamoyl which is mono- or disubstituted on the nitrogen atom by $C_1$–$C_4$alkyl, phenyl or naphthyl and can be further substituted in the $C_1$–$C_4$alkyl, phenyl and naphthyl radical by the abovementioned substituents. Preferred substituents of the benzene rings I and II are $C_1$–$C_4$alkyl, $C_1$–$C_4$alkoxy, $C_2$–$C_4$alkanoylamino and halogen, in particular methyl, methoxy, acetylamino and chlorine.

Preferably, the azo dyes of the formula (1) contain only one sulfo group.

Preference is given to azo dyes of the formula (1) in which R is hydrogen or unsubstituted or hydroxyl-substituted $C_1$–$C_4$alkyl, in particular in which R is methyl, hydroxymethyl or ethyl, preferably methyl or ethyl.

Further preference is given to azo dyes of the formula (1) in which $R_1$ and $R_2$, independently of one another, are hydrogen, $C_1$–$C_4$alkyl, in particular methyl or ethyl, or phenyl.

Furthermore, preference is given to azo dyes of the formula (1) in which $R_3$ is hydrogen, $C_1$–$C_4$alkyl or phenyl.

In the azo dyes of the formula (1), the sulfo group is preferably bound to the benzene ring I.

Particular preference is given to azo dyes of the formula (1) in which R is hydrogen or unsubstituted or hydroxyl-substituted $C_1$–$C_4$alkyl, $R_1$ and $R_2$, independently of one another, are hydrogen or $C_1$–$C_4$alkyl, $R_3$ is hydrogen, $C_1$–$C_4$alkyl or phenyl, the benzene rings I and II, independently of one another, may be further substituted by $C_1$–$C_4$alkyl, $C_1$–$C_4$alkoxy, $C_2$–$C_4$alkanoylamino or halogen and the sulfo group is bound to the benzene ring I.

Very particular preference is given to azo dyes of the formula

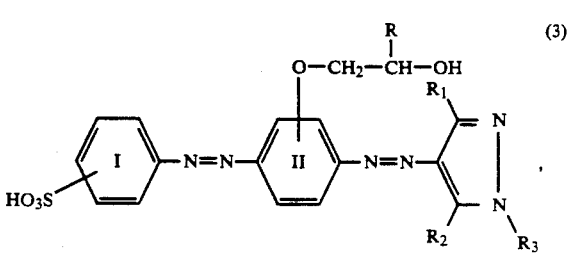

in which R is methyl or ethyl, $R_1$ and $R_2$, independently of one another, are methyl or ethyl, $R_3$ is hydrogen, methyl, ethyl or phenyl and the benzene rings I and II, independently of one another, may be further substituted by methyl, methoxy, acetylamino or chlorine.

The invention furthermore relates to a process for the preparation of the azo dyes of the formula (1), which comprises diazotising an amine of the formula

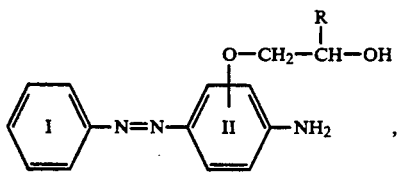 (4)

in which R is as defined in formula (1) and the benzene rings I and II may be further substituted, and coupling the resulting product onto a coupling component of the formula

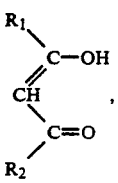 (5a)

in which $R_1$ and $R_2$, independently of one another, are substituted or unsubstituted $C_1$–$C_8$alkyl or phenyl, or onto a coupling component of the formula

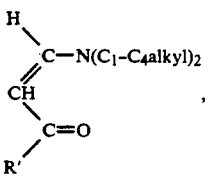 (5b)

in which R' has the meanings given for $R_1$ and $R_2$ in formula (1), and reacting the reaction product of the formula

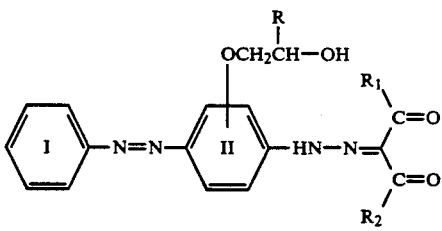 (6)

with a hydrazine of the formula

$H_2N$—$NH$—$R_3$ (7), in which $R_3$ is as defined in formula (1), the amine of the formula (4), the reacted coupling component of the formula (5a) or (5b) and the hydrazine of the formula (7) together containing at least one sulfo group. Accordingly, if the amine of the formula (4) or the reacted coupling component of the formula (5a) or (5b) contains a sulfo group, the reaction product of the formula (6) also contains such a group.

Diazotisation of the amine of the formula (4) is usually carried out by reaction with nitrous acid in aqueous mineral acid solution at low temperature, while coupling onto the coupling component of the formula (5a) or (5b) takes place at acidic, neutral to weakly alkaline pH values, in particular at a pH of 2 to 6.

The reaction of the compound of the formula (6) with a hydrazine of the formula (7) is carried out in water, an organic solvent, for example methanol, ethanol, pyridine or glacial acetic acid, or a mixture of water and an organic solvent, for example water/glacial acetic acid, at a temperature of 40° to 100° C., in particular at a temperature of 40° to 60° C.

The amines of the formula (4), the coupling components of the formula (5a) and (5b) and the hydrazines of the formula (7) are known per se or can be prepared in analogy to known compounds.

Examples of amines of the formula (4) are
3-($\beta$-hydroxypropoxy)-4-aminoazobenzene-2'-, -3'- or -4'-sulfonic acid,
3-($\beta$-hydroxypropoxy)-4-amino-6-methylazobenzene-2'-, -3'- or -4'-sulfonic acid,
3-($\beta$-hydroxypropoxy)-4-amino-6-methoxyazobenzene-2', -3'- or -4'-sulfonic acid,
3-($\beta$-hydroxypropoxy)-4-amino-6-acetylaminoazobenzene-2'-, -3'- or -4'-sulfonic acid,
3-($\beta$-hydroxypropoxy)-4-amino-6-chloroazobenzene-2'-, -3'- or -4'-sulfonic acid,
3-($\beta$-hydroxypropoxy)-4-amino-2'-chloroazobenzene-3'-, -4'-, -5'- or -6'-sulfonic acid,
3-($\beta$-hydroxybutoxy)-4-aminoazobenzene-2'-, 3'- or -4'-sulfonic acid,
3-($\beta$-hydroxybutoxy)-4-amino-6-methylazobenzene-2'-, -3'- or -4'-sulfonic acid,
3-($\beta$-hydroxybutoxy)-4-amino-6-methoxyazobenzene-2'-, -3'- or -4'-sulfonic acid,
3-($\beta$-hydroxybutoxy)-4-amino-6-acetylaminoazobenzene-2'-, -3'- or -4'-sulfonic acid,
3-($\beta$-hydroxybutoxy)-4-amino-6-chloroazobenzene-2'-, -3'- or -4'-sulfonic acid,
3-($\beta$-hydroxybutoxy)-4-amino-2'-chloroazobenzene-3'-, -4'-, -5'- or -6'-sulfonic acid.

Examples of coupling components of the formulae (5a) and (5b) are 3-diethylaminopropen-1-al, 4-diethylaminobuten-2-one, 2,4-pentanedione, 2,4-hexanedione, 3,5-heptanedione, 2,4-heptanedione, 3,5-octanedione, 4,6-octanedione, dibenzoylmethane, formylacetophenone and benzoylacetone.

Examples of compounds of the formula (7) are hydrazine, methyl-, ethyl-, propyl-, isopropyl-, butyl-, isobutyl-, sec-butyl-, tert-butyl-, phenyl- and cyclohexylhydrazine and 4-sulfophenylhydrazine.

Preferred embodiments of the process according to the invention are those in which
an amine of the formula (4) is used in which the benzene rings I and II, independently of one another, may be further substituted by $C_1$–$C_4$alkyl, $C_1$–$C_4$alkoxy, $C_2$–$C_4$alkanoylamino or halogen;
an amine of the formula (4) is used in which the sulfo group is bound to the benzene ring I;
an amine of the formula (4) is used in which R is hydrogen or unsubstituted or hydroxyl-substituted $C_1$–$C_4$alkyl, in particular in which R is methyl, hydroxymethyl or ethyl, preferably methyl or ethyl;
a coupling component of the formula (5a) is used in which $R_1$ and $R_2$, independently of one another, are phenyl or $C_1$–$C_4$alkyl, in particular methyl or ethyl, or a coupling component of the formula (5b) is used in which R' is hydrogen, phenyl or $C_1$–$C_4$alkyl, in particular methyl or ethyl;

a compound of the formula (7) is used in which $R_3$ is hydrogen, $C_1$-$C_4$alkyl or phenyl;

an amine of the formula (4), a coupling component of the formula (5a) or (5b) and a compound of the formula (7) are used which together contain only one sulfo group.

In a particularly preferred embodiment of the process according to the invention, an amine of the formula (4) in which R is hydrogen or unsubstituted or hydroxyl-substituted $C_1$-$C_4$alkyl and the benzene rings I and II, independently of one another, may be further substituted by $C_1$-$C_4$alkyl, $C_1$-$C_4$alkoxy, $C_2$-$C_4$alkanoylamino or halogen and the sulfo group is bound to the benzene ring I, is diazotised, the product is coupled onto a coupling component of the formula (5a), in which $R_1$ and $R_2$ are $C_1$-$C_4$alkyl, or onto a coupling component of the formula (5b), in which R' is hydrogen, and the reaction product obtained is reacted with a compound of the formula (7), in which $R_3$ is hydrogen, $C_1$-$C_4$alkyl or phenyl.

In a very particularly preferred embodiment of the process according to the invention for the preparation of the azo dyes of the formula (1), an amine of the formula

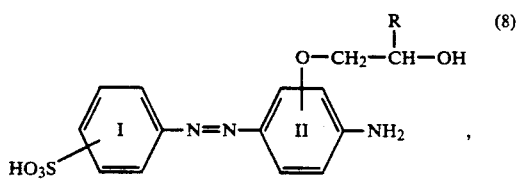

(8)

in which R is as defined in formula (3) and the benzene rings I and II may be substituted as indicated in formula (3), is diazotised, the product is coupled onto a coupling component of the formula (5a), in which $R_1$ and $R_2$ are as defined in formula (3), and the reaction product obtained is reacted with a compound of the formula (7), in which $R_3$ is as defined in formula (3).

The invention furthermore relates to a process for the trichromatic dyeing or printing of natural and synthetic polyamide fibre materials using a dye mixture comprising at least one yellow- or orange-dyeing dye of the formula (1) together with at least one red-dyeing dye and at least one blue-dyeing dye, the dye of the formula (1) having in particular the abovementioned preferences; preferably, the yellow- or orange-dyeing dye used is a dye of the formula (3).

In the process according to the invention for the trichromatic dyeing or printing, at least one dye of the formula (1) is preferably used together with at least one of the red-dyeing dyes of the formulae (9), (10) and (11):

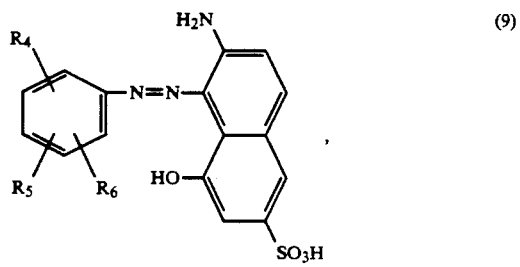

(9)

in which $R_4$ is substituted or unsubstituted $C_1$-$C_8$alkyl, halogen, phenylsulfonyl or phenoxysulfonyl which is unsubstituted or substituted in the phenyl ring by $C_1$-$C_4$alkyl, or is cyclohexyloxycarbonylamino, $C_2$-$C_4$alkanoylamino, benzoylamino which is unsubstituted or substituted in the phenyl ring by halogen, or is 1-azacycloheptane-N-sulfonyl or

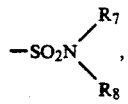

in which $R_7$ is $C_1$-$C_8$alkyl or unsubstituted or $C_1$-$C_4$alkyl-substituted phenyl or cyclohexyl and $R_8$ is hydrogen or $C_1$-$C_8$alkyl, $R_5$ is hydrogen, halogen, $C_1$-$C_8$alkyl or $C_2$-$C_4$alkanoylamino and $R_6$ is hydrogen or halogen,

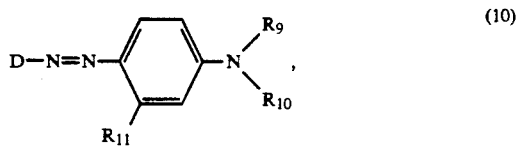

(10)

in which D is substituted or unsubstituted phenyl, thiophenyl or benzothiazolyl, $R_9$ is $C_1$-$C_8$alkyl, $R_{10}$ is substituted or unsubstituted $C_1$-$C_8$alkyl and $R_{11}$ is hydrogen or $C_1$-$C_4$alkyl, and

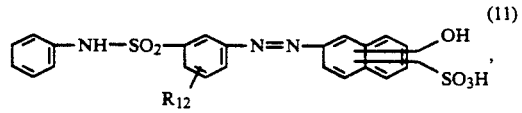

(11)

in which $R_{12}$ is $C_1$-$C_4$alkyl, and together with at least one blue-dyeing dye of the formula

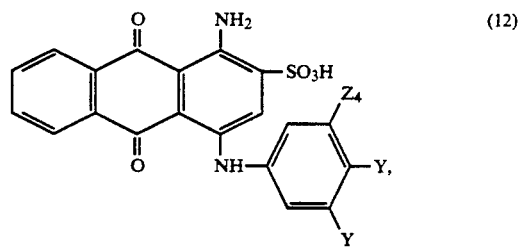

(12)

in which one Y is hydrogen or methyl and the other Y is $C_2$-$C_4$alkanoylamino or $C_2$-$C_4$hydroxyalkylsulfamoyl and $Z_4$ is hydrogen or methyl, the dye of the formula (1) having in particular the abovementioned preferences; preferably, the yellow- or orange-dyeing dye used is a dye of the formula (3).

The dyes of the formulae (9), (10), (11) and (12) used in the process according to the invention for the trichromatic dyeing or printing are known per se or can be prepared in analogy to known dyes.

Examples of $R_4$, $R_5$, $R_7$ and $R_8$ in formula (9) and $R_9$ and $R_{10}$ in formula (10) as $C_1$-$C_8$alkyl are, independently of one another, methyl, ethyl, propyl, isopropyl, butyl, sec-butyl, tert-butyl, isobutyl, pentyl, hexyl, heptyl and octyl. $R_4$, $R_5$, $R_7$, $R_8$, $R_9$ and $R_{10}$ are preferably $C_1$-$C_4$alkyl.

The radical $R_4$ in formula (9) as $C_1$-$C_8$alkyl can be substituted, for example, by halogen, for example chlorine or bromine and in particular fluorine. One example is the trifluoromethyl radical.

The radical $R_{10}$ in formula (10) as $C_1$-$C_8$alkyl can be substituted, for example, by sulfo, sulfato or phenyl. Examples are benzyl, β-sulfoethyl, γ-sulfopropyl and β-sulfatoethyl.

Examples of $R_4$, $R_5$ and $R_6$ in formula (9) as halogen are, independently of one another, fluorine, bromine or in particular chlorine.

The radical $R_4$ in formula (9) as benzoylamino can be substituted in the phenyl ring by halogen, for example fluorine, bromine or in particular chlorine.

The radical $R_7$ as phenyl or cyclohexyl and the radical $R_4$ as phenylsulfonyl or phenoxysulfonyl can be substituted by $C_1$-$C_4$alkyl, for example methyl, ethyl, propyl, isopropyl, butyl, sec-butyl, tert-butyl or isobutyl, in particular methyl.

Examples of $R_{11}$ in formula (10) and $R_{12}$ in formula (11) as $C_1$-$C_4$alkyl are, independently of one another, methyl, ethyl, propyl, isopropyl, butyl, sec-butyl, tert-butyl or isobutyl, in particular methyl.

Examples of $R_4$ and $R_5$ in formula (9) and Y in formula (12) as $C_2$-$C_4$alkanoylamino are, independently of one another, acetylamino, propionylamino or butyrylamino.

The radical D in formula (10) can be substituted, for example, by halogen, such as fluorine, chlorine or bromine, $C_1$-$C_4$alkyl, such as methyl, ethyl, propyl, isopropyl, butyl, sec-butyl, tert-butyl or isobutyl, $C_1$-$C_4$alkoxy, for example methoxy, ethoxy, propoxy or butoxy, $C_1$-$C_4$alkoxycarbonyl, for example methoxycarbonyl or ethoxycarbonyl, sulfo or $C_1$-$C_4$alkylaminosulfonyl which is unsubstituted or substituted in the alkyl moiety by sulfo, for example, methylaminosulfonyl, ethylaminosulfonyl or β-sulfoethylaminosulfonyl.

Examples of Y in formula (12) as $C_{2-4}$hydroxyalkylsulfamoyl radical are β-hydroxyethylsulfamoyl, β-hydroxypropylsulfamoyl, γ-hydroxypropylsulfamoyl or β-hydroxybutylsulfamoyl.

For the process according to the invention for the trichromatic dyeing or printing, at least one of the red-dyeing dyes of the formulae (9), (10) and (11) is preferably used, $R_4$ in the dye of the formula (9) being trifluoromethyl, chlorine, acetylamino, —$SO_2N(n$—$C_4H_9)_2$, phenoxysulfonyl, phenylsulfonyl, 1-azacycloheptane-N-sulfonyl, cyclohexyloxycarbonylamino, benzoylamino which is unsubstituted or substituted in the phenyl ring by chlorine or phenylaminosulfonyl which is unsubstituted or substituted in the phenyl ring by methyl, cyclohexylaminosulfonyl, N-($C_1$-$C_2$alkyl)phenyl- or N-($C_1$-$C_2$alkyl)cyclohexylaminosulfonyl, $R_5$ being hydrogen, methyl, chlorine or acetylamino and $R_6$ being hydrogen or chlorine, and D in the dye of the formula (10) being phenyl which is substituted by chlorine, sulfo, methylaminosulfonyl, ethylaminosulfonyl or β-sulfoethylaminosulfonyl, thiophenyl which is substituted by methyl, methoxy- or ethoxycarbonyl or benzothiophenyl which is unsubstituted or substituted by methyl, methoxy or sulfo, $R_9$ being ethyl, $R_{10}$ being ethyl, β-sulfatoethyl, —$(CH_2)_{2-3}SO_3H$ or benzyl and $R_{11}$ being hydrogen or methyl, and $R_{12}$ in the dye of the formula (11) being methyl.

Particularly preferably, at least one of the red-dyeing dyes of the formulae

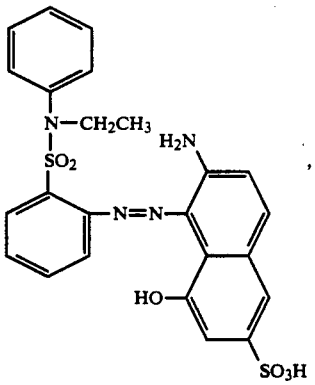
(13)

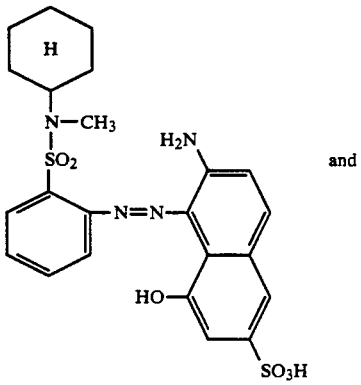
and
(14)

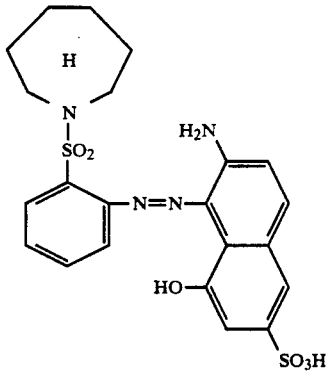
(15)

is used.

Also particularly preferably, at least one of the blue-dyeing dyes of the formulae

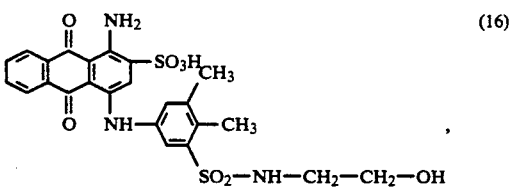
(16)

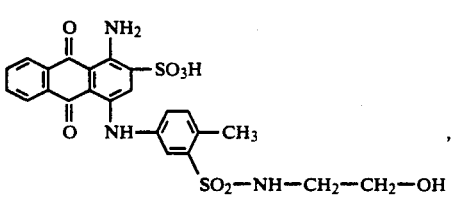
(17)

,

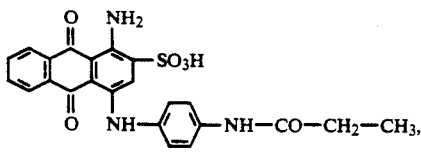

(18)

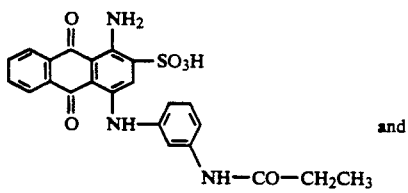

(19)

and

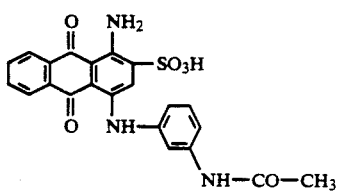

(20)

is used for the process according to the invention.

When mixtures of blue-dyeing dyes are used for the process according to the invention, the mixture of blue-dyeing dyes of the formula (16) or (17) with a dye of the formula (18), (19) or (20) is preferred. Very particular preference is given to the mixture of the blue-dyeing dyes of the formulae

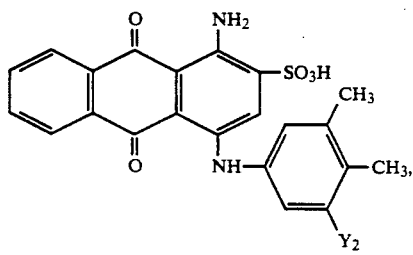

(21)

in which $Y_2$ is a $C_{2-4}$hydroxyalkylsulfamoyl radical, and

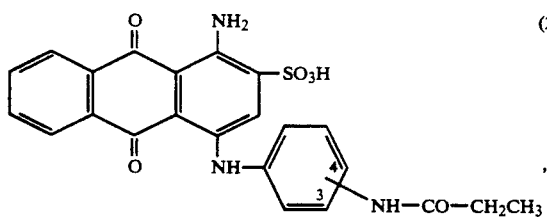

(22)

in which the radical —NH—CO—CH$_2$CH$_3$ is bound in the 3 or 4 position.

For the process according to the invention for the trichromatic dyeing or printing, at least one dye of the formula (1) is very particularly preferably used together with at least one of the red-dyeing dyes of the formulae (13), (14) and (15), in particular (13) and (14), and at least one of the blue-dyeing dyes of the formulae (16), (17), (18), (19) and (20), the dye of the formula (1) having in particular the abovementioned preferences; preferably, the yellow- or orange-dyeing used is a dye of the formula (3).

In an extremely important embodiment of the process according to the invention for the trichromatic dyeing or printing, at least one dye of the formula (1) is used together with a red-dyeing dye of the formula (14) and a blue-dyeing dye of the formula (16), the dye of the formula (1) having in particular the abovementioned preferences; preferably, the yellow- or orange-dyeing dye used is a dye of the formula (3).

When dye mixtures are used in the process according to the invention, they can be prepared by mixing the individual dyes. This mixing process takes place, for example, in suitable mills, for example ball and pinned-disc mills, and in kneaders or mixers.

Furthermore, the dye mixtures of the dyes can be prepared by spray-drying of the aqueous dye mixtures.

The dyes according to the invention of the formula (1) and the dyes used in the process according to the invention for the trichromatic dyeing or printing are present either in the form of their free sulfonic acid or preferably as salts thereof.

Examples of suitable salts are the alkali metal salts, alkaline earth metal salts or ammonium salts or the salts of an organic amine. Examples are the sodium salts, lithium salts, potassium salts or ammonium salts or the salt of mono-, di- or triethanolamine.

The dyes according to the invention of the formula (1) and the dyes used in the process according to the invention usually contain further additives, for example common salt or dextrin.

The process according to the invention for the trichromatic dyeing or printing can be applied to the customary dyeing or printing processes. The dye liquors or printing pastes can, in addition to water and the dyes, contain further additives, for example wetting agents, antifoams, levelling agents or agents affecting the property of the textile material, for example softeners, additives for flameproof finish or soil-, water- and oil-repellent agents and water softeners and natural or synthetic thickening agents, for example alginates and cellulose ethers.

The dyes according to the invention of the formula (1) and the process according to the invention for trichromatic dyeing or printing are suitable in particular for the dyeing from short liquors, for example in continuous dyeing processes or batchwise and continuous foam dyeing processes.

The dyes according to the invention of the formula (1) and the dyes used in the process according to the invention are distinguished in trichromatic dyeing or printing by uniform colour buildup, good affinity, good constancy of shade even in different concentrations, good fastness properties and in particular very good compatibility.

The dyes according to the invention of the formula (1) and the process according to the invention for trichromatic dyeing or printing are suitable for the dyeing or printing not only of natural polyamide fibre materials, for example wool, but in particular also of synthetic polyamide fibre materials, for example nylon 6 or nylon 6.6, and are suitable for the dyeing or printing of wool and synthetic polyamide blended fabrics or yarns.

The textile material mentioned can be present in a wide range of processing forms, for example as fibre, yarn, woven fabric or knitted fabric and in particular in the form of carpets.

The azo dyes according to the invention of the formula (1) produce level dyeings having good general fastness properties, in particular good rub, wet, wetrub and light fastness. Furthermore, the dyes according to the invention are readily water-soluble and resistant to hard water.

In the examples which follow, parts are by weight. Temperatures are degrees centigrade. Parts by weight relate to parts by volume as the gram relates to the cubic centimeter.

EXAMPLE 1

A neutral, hot solution of 50° of 37 parts of 3-($\beta$-hydroxypropoxy)-4-aminoazobenzene-3'-sulfonic acid in 500 parts of water are run simultaneously with 26 parts of an aqueous sodium nitrite solution (4N) into the mixture of 28 parts of concentrated hydrochloric acid in 200 parts of water, and the temperature of the reaction mixture is maintained at 20° to 25° by addition of ice. After addition is complete, stirring is continued for 2 hours, and the nitrite excess is destroyed with a small amount of sulfamic acid. The diazotisation mixture thus prepared is slowly run into a cold solution of 0° to 5° of 14 parts of 2,4-pentanedione and 180 parts of sodium acetate in 500 parts of water. After stirring at 0° to 5° for several hours, the mixture is heated to 30° in order to complete the reaction, and the pH is brought to 5.5 with sodium acetate. The precipitate is then filtered off with suction and dried at 60°, giving 44 parts of an orange powder.

5 parts of the reaction product prepared by the above procedure are suspended in 80 parts of glacial acetic acid and 6 parts of water at room temperature. 1.2 parts of hydrazine hydrate are added all at once with stirring. The reaction mixture is slowly heated to 50° and stirred for 2 hours. Finally, it is heated at 90° for about 10 minutes until no more educt can be detected by thin-layer chromatography. After cooling to room temperature, the dye is precipitated by addition of hydrochloric acid (2N). Filtration, washing with a small amount of water and drying at a temperature of 80° give 4.8 parts of a dye which, in the form of the free acid, corresponds to the compound of the formula

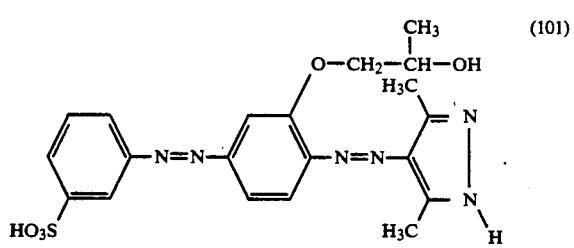

The dye of the formula (101) dyes synthetic and natural polyamide fibre material in yellow hues.

EXAMPLES 2 TO 117

The procedure described in Example 1 is repeated, except that an equimolar amount of the compound of the formula

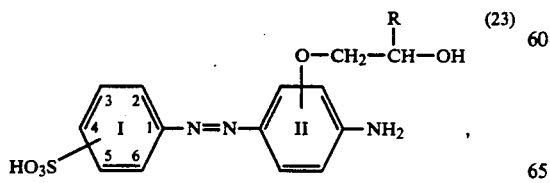

in which the sulfo group is bound to the benzene ring I in the position given in Table 1 in column 2, R has the meanings given in Table 1 in column 3, and the benzene rings I and II do not contain any further substituents, is used instead of 37 parts of 3-($\beta$-hydroxypropoxy)-4-aminoazobenzene-3'-sulfonic acid, and an equimolar amount of the compound of the formula

in which $R_1$ and $R_2$ have the meanings given in Table 1 in columns 4 and 5 but are not hydrogen, is used instead of 14 parts of 2,4-pentanedione, and an equimolar amount of the compound of the formula

in which $R_3$ has the meanings given in Table 1 in column 6, is used instead of 1.2 parts of hydrazine hydrate, giving analogous dyes which dye synthetic and natural polyamide fibre materials in yellow hues.

The dyes listed in Table 1 below, in which at least one of the radicals $R_1$ and $R_2$ is hydrogen, are obtained as described, except that an equimolar amount of the compound of the formula

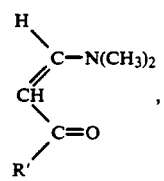

in which R' has the meanings given for $R_1$ or $R_2$ in Table 1 and the other radical $R_1$ or $R_2$ in Table 1 is hydrogen, is used instead of the compound of the formula (5a).

The dyes listed in the examples of Table 1 below, in which $R_1$ and $R_2$ have meanings which are different from one another and $R_3$ is not hydrogem, are obtained as mixtures of isomeric compounds of the formulae

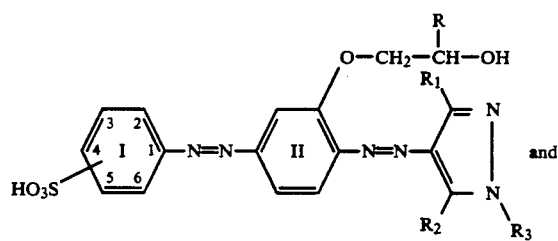

and

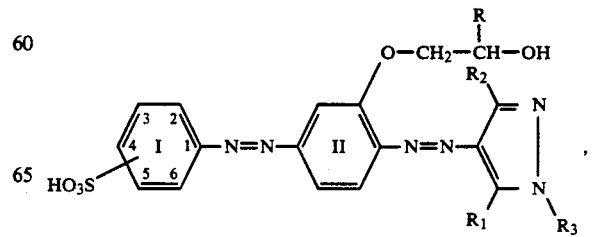

, in which R, $R_1$, $R_2$ and $R_3$ have the meanings given in Table 1 in columns 3 to 6 and the sulfo group is bound to the benzene ring I in the position given in Table 1 in column 2, and the benzene rings I and II do not contain any further substituents. The mixtures of isomers dye synthetic and natural polyamide fibre materials in yellow hues.

TABLE 1

| Ex. | Substituent benzene ring I | R | $R_1$ | $R_2$ | $R_3$ |
|---|---|---|---|---|---|
| 2 | 4-$SO_3H$ | —H | —$CH_3$ | —$CH_3$ | —H |
| 3 | 4-$SO_3H$ | —H | —$CH_3$ | —$CH_3$ | —$CH_3$ |
| 4 | 4-$SO_3H$ | —H | —$CH_3$ | —$CH_3$ | —$C_2H_5$ |
| 5 | 4-$SO_3H$ | —H | —$CH_3$ | —$CH_3$ | Phenyl |
| 6 | 3-$SO_3H$ | —H | —$CH_3$ | —$CH_3$ | —H |
| 7 | 3-$SO_3H$ | —H | —$CH_3$ | —$CH_3$ | —$CH_3$ |
| 8 | 3-$SO_3H$ | —H | —$CH_3$ | —$CH_3$ | —$C_2H_5$ |
| 9 | 3-$SO_3H$ | —H | —$CH_3$ | —$CH_3$ | Phenyl |
| 10 | 2-$SO_3H$ | —H | —$CH_3$ | —$CH_3$ | —H |
| 11 | 2-$SO_3H$ | —H | —$CH_3$ | —$CH_3$ | —$CH_3$ |
| 12 | 2-$SO_3H$ | —H | —$CH_3$ | —$CH_3$ | —$C_2H_5$ |
| 13 | 2-$SO_3H$ | —H | —$CH_3$ | —$CH_3$ | Phenyl |
| 14 | 4-$SO_3H$ | —H | —$CH_3$ | —$C_2H_5$ | —H |
| 15 | 4-$SO_3H$ | —H | —$CH_3$ | —$C_2H_5$ | —$CH_3$ |
| 16 | 4-$SO_3H$ | —H | —$CH_3$ | —$C_2H_5$ | —$C_2H_5$ |
| 17 | 4-$SO_3H$ | —H | —$CH_3$ | —$C_2H_5$ | Phenyl |
| 18 | 3-$SO_3H$ | —H | —$CH_3$ | —$C_2H_5$ | —H |
| 19 | 3-$SO_3H$ | —H | —$CH_3$ | —$C_2H_5$ | —$CH_3$ |
| 20 | 3-$SO_3H$ | —H | —$CH_3$ | —$C_2H_5$ | —$C_2H_5$ |
| 21 | 3-$SO_3H$ | —H | —$CH_3$ | —$C_2H_5$ | Phenyl |
| 22 | 2-$SO_3H$ | —H | —$CH_3$ | —$C_2H_5$ | —H |
| 23 | 2-$SO_3H$ | —H | —$CH_3$ | —$C_2H_5$ | —$CH_3$ |
| 24 | 2-$SO_3H$ | —H | —$CH_3$ | —$C_2H_5$ | —$C_2H_5$ |
| 25 | 2-$SO_3H$ | —H | —$CH_3$ | —$C_2H_5$ | Phenyl |
| 26 | 4-$SO_3H$ | —H | —$C_2H_5$ | —$C_2H_5$ | —H |
| 27 | 4-$SO_3H$ | —H | —$C_2H_5$ | —$C_2H_5$ | —$CH_3$ |
| 28 | 4-$SO_3H$ | —H | —$C_2H_5$ | —$C_2H_5$ | —$C_2H_5$ |
| 29 | 4-$SO_3H$ | —H | —$C_2H_5$ | —$C_2H_5$ | Phenyl |
| 30 | 3-$SO_3H$ | —H | —$C_2H_5$ | —$C_2H_5$ | —H |
| 31 | 3-$SO_3H$ | —H | —$C_2H_5$ | —$C_2H_5$ | —$CH_3$ |
| 32 | 3-$SO_3H$ | —H | —$C_2H_5$ | —$C_2H_5$ | —$C_2H_5$ |
| 33 | 3-$SO_3H$ | —H | —$C_2H_5$ | —$C_2H_5$ | Phenyl |
| 34 | 2-$SO_3H$ | —H | —$C_2H_5$ | —$C_2H_5$ | —H |
| 35 | 2-$SO_3H$ | —H | —$C_2H_5$ | —$C_2H_5$ | —$CH_3$ |
| 36 | 2-$SO_3H$ | —H | —$C_2H_5$ | —$C_2H_5$ | —$C_2H_5$ |
| 37 | 2-$SO_3H$ | —H | —$C_2H_5$ | —$C_2H_5$ | Phenyl |
| 38 | 4-$SO_3H$ | —$CH_3$ | —$CH_3$ | —$CH_3$ | —H |
| 39 | 4-$SO_3H$ | —$CH_3$ | —$CH_3$ | —$CH_3$ | —$CH_3$ |
| 40 | 4-$SO_3H$ | —$CH_3$ | —$CH_3$ | —$CH_3$ | —$C_2H_5$ |
| 41 | 4-$SO_3H$ | —$CH_3$ | —$CH_3$ | —$CH_3$ | Phenyl |
| 42 | 3-$SO_3H$ | —$CH_3$ | —$CH_3$ | —$CH_3$ | —H |
| 43 | 3-$SO_3H$ | —$CH_3$ | —$CH_3$ | —$CH_3$ | —$C_2H_5$ |
| 44 | 3-$SO_3H$ | —$CH_3$ | —$CH_3$ | —$CH_3$ | Phenyl |
| 45 | 3-$SO_3H$ | —$CH_3$ | —$CH_3$ | —$CH_3$ | —H |
| 46 | 2-$SO_3H$ | —$CH_3$ | —$CH_3$ | —$CH_3$ | —$CH_3$ |
| 47 | 2-$SO_3H$ | —$CH_3$ | —$CH_3$ | —$CH_3$ | —$C_2H_5$ |
| 48 | 2-$SO_3H$ | —$CH_3$ | —$CH_3$ | —$CH_3$ | Phenyl |
| 49 | 2-$SO_3H$ | —$CH_3$ | —$CH_3$ | —$C_2H_5$ | —H |
| 50 | 4-$SO_3H$ | —$CH_3$ | —$CH_3$ | —$C_2H_5$ | —$CH_3$ |
| 51 | 4-$SO_3H$ | —$CH_3$ | —$CH_3$ | —$C_2H_5$ | —$C_2H_5$ |
| 52 | 4-$SO_3H$ | —$CH_3$ | —$CH_3$ | —$C_2H_5$ | Phenyl |
| 53 | 4-$SO_3H$ | —$CH_3$ | —$CH_3$ | —$C_2H_5$ | —H |
| 54 | 3-$SO_3H$ | —$CH_3$ | —$CH_3$ | —$C_2H_5$ | —$CH_3$ |
| 55 | 3-$SO_3H$ | —$CH_3$ | —$C_2H_5$ | —$C_2H_5$ | —$C_2H_5$ |
| 56 | 3-$SO_3H$ | —$CH_3$ | —$C_2H_5$ | —$C_2H_5$ | Phenyl |
| 57 | 2-$SO_3H$ | —$CH_3$ | —$C_2H_5$ | —$C_2H_5$ | —H |
| 58 | 2-$SO_3H$ | —$CH_3$ | —$C_2H_5$ | —$C_2H_5$ | —$CH_3$ |
| 59 | 2-$SO_3H$ | —$CH_3$ | —$C_2H_5$ | —$C_2H_5$ | —$C_2H_5$ |
| 60 | 2-$SO_3H$ | —$CH_3$ | —$C_2H_5$ | —$C_2H_5$ | Phenyl |
| 61 | 4-$SO_3H$ | —$CH_3$ | —$C_2H_5$ | —$C_2H_5$ | —H |
| 62 | 4-$SO_3H$ | —$CH_3$ | —$C_2H_5$ | —$C_2H_5$ | —$CH_3$ |
| 63 | 4-$SO_3H$ | —$CH_3$ | —$C_2H_5$ | —$C_2H_5$ | —$C_2H_5$ |
| 64 | 4-$SO_3H$ | —$CH_3$ | —$C_2H_5$ | —$C_2H_5$ | Phenyl |
| 65 | 3-$SO_3H$ | —$CH_3$ | —$C_2H_5$ | —$C_2H_5$ | —H |
| 66 | 3-$SO_3H$ | —$CH_3$ | —$C_2H_5$ | —$C_2H_5$ | —$CH_3$ |
| 67 | 3-$SO_3H$ | —$CH_3$ | —$C_2H_5$ | —$C_2H_5$ | —$C_2H_5$ |
| 68 | 3-$SO_3H$ | —$CH_3$ | —$C_2H_5$ | —$C_2H_5$ | Phenyl |
| 69 | 2-$SO_3H$ | —$CH_3$ | —$C_2H_5$ | —$C_2H_5$ | —H |
| 70 | 2-$SO_3H$ | —$CH_3$ | —$C_2H_5$ | —$C_2H_5$ | —$CH_3$ |
| 71 | 2-$SO_3H$ | —$CH_3$ | —$C_2H_5$ | —$C_2H_5$ | —$C_2H_5$ |
| 72 | 2-$SO_3H$ | —$CH_3$ | —$C_2H_5$ | —$C_2H_5$ | Phenyl |
| 73 | 4-$SO_3H$ | —$C_2H_5$ | —$CH_3$ | —$CH_3$ | —H |
| 74 | 4-$SO_3H$ | —$C_2H_5$ | —$CH_3$ | —$CH_3$ | —$CH_3$ |
| 75 | 4-$SO_3H$ | —$C_2H_5$ | —$CH_3$ | —$CH_3$ | —$C_2H_5$ |
| 76 | 4-$SO_3H$ | —$C_2H_5$ | —$CH_3$ | —$CH_3$ | Phenyl |
| 77 | 3-$SO_3H$ | —$C_2H_5$ | —$CH_3$ | —$CH_3$ | —H |
| 78 | 3-$SO_3H$ | —$C_2H_5$ | —$CH_3$ | —$CH_3$ | —$CH_3$ |
| 79 | 3-$SO_3H$ | —$C_2H_5$ | —$CH_3$ | —$CH_3$ | —$C_2H_5$ |
| 80 | 3-$SO_3H$ | —$C_2H_5$ | —$CH_3$ | —$CH_3$ | Phenyl |
| 81 | 2-$SO_3H$ | —$C_2H_5$ | —$CH_3$ | —$CH_3$ | —H |
| 82 | 2-$SO_3H$ | —$C_2H_5$ | —$CH_3$ | —$CH_3$ | —$CH_3$ |
| 83 | 2-$SO_3H$ | —$C_2H_5$ | —$CH_3$ | —$CH_3$ | —$C_2H_5$ |
| 84 | 2-$SO_3H$ | —$C_2H_5$ | —$CH_3$ | —$CH_3$ | Phenyl |
| 85 | 4-$SO_3H$ | —$C_2H_5$ | —$CH_3$ | —$C_2H_5$ | —H |
| 86 | 4-$SO_3H$ | —$C_2H_5$ | —$CH_3$ | —$C_2H_5$ | —$CH_3$ |
| 87 | 4-$SO_3H$ | —$C_2H_5$ | —$CH_3$ | —$C_2H_5$ | —$C_2H_5$ |
| 88 | 4-$SO_3H$ | —$C_2H_5$ | —$CH_3$ | —$C_2H_5$ | Phenyl |
| 89 | 3-$SO_3H$ | —$C_2H_5$ | —$CH_3$ | —$C_2H_5$ | —H |
| 90 | 3-$SO_3H$ | —$C_2H_5$ | —$CH_3$ | —$C_2H_5$ | —$CH_3$ |
| 91 | 3-$SO_3H$ | —$C_2H_5$ | —$CH_3$ | —$C_2H_5$ | —$C_2H_5$ |
| 92 | 3-$SO_3H$ | —$C_2H_5$ | —$CH_3$ | —$C_2H_5$ | Phenyl |
| 93 | 2-$SO_3H$ | —$C_2H_5$ | —$CH_3$ | —$C_2H_5$ | —H |
| 94 | 2-$SO_3H$ | —$C_2H_5$ | —$CH_3$ | —$C_2H_5$ | —$CH_3$ |
| 95 | 2-$SO_3H$ | —$C_2H_5$ | —$CH_3$ | —$C_2H_5$ | —$C_2H_5$ |
| 96 | 2-$SO_3H$ | —$C_2H_5$ | —$CH_3$ | —$C_2H_5$ | Phenyl |
| 97 | 4-$SO_3H$ | —$C_2H_5$ | —$C_2H_5$ | —$C_2H_5$ | —H |
| 98 | 4-$SO_3H$ | —$C_2H_5$ | —$C_2H_5$ | —$C_2H_5$ | —$CH_3$ |
| 99 | 4-$SO_3H$ | —$C_2H_5$ | —$C_2H_5$ | —$C_2H_5$ | —$C_2H_5$ |
| 100 | 4-$SO_3H$ | —$C_2H_5$ | —$C_2H_5$ | —$C_2H_5$ | Phenyl |
| 101 | 3-$SO_3H$ | —$C_2H_5$ | —$C_2H_5$ | —$C_2H_5$ | —H |
| 102 | 3-$SO_3H$ | —$C_2H_5$ | —$C_2H_5$ | —$C_2H_5$ | —$CH_3$ |
| 103 | 3-$SO_3H$ | —$C_2H_5$ | —$C_2H_5$ | —$C_2H_5$ | —$C_2H_5$ |
| 104 | 3-$SO_3H$ | —$C_2H_5$ | —$C_2H_5$ | —$C_2H_5$ | Phenyl |
| 105 | 2-$SO_3H$ | —$C_2H_5$ | —$C_2H_5$ | —$C_2H_5$ | —H |
| 106 | 2-$SO_3H$ | —$C_2H_5$ | —$C_2H_5$ | —$C_2H_5$ | —$CH_3$ |
| 107 | 2-$SO_3H$ | —$C_2H_5$ | —$C_2H_5$ | —$C_2H_5$ | —$C_2H_5$ |
| 108 | 2-$SO_3H$ | —$C_2H_5$ | —$C_2H_5$ | —$C_2H_5$ | Phenyl |
| 109 | 4-$SO_3H$ | —$CH_3$ | —$CH_3$ | —$CH_3$ | -n-$C_3H_7$ |
| 110 | 4-$SO_3H$ | —$CH_3$ | —$CH_3$ | —$CH_3$ | -iso-$C_3H_7$ |
| 111 | 3-$SO_3H$ | —$CH_3$ | —$CH_3$ | —$CH_3$ | -n-$C_4H_9$ |
| 112 | 3-$SO_3H$ | —$CH_3$ | —$CH_3$ | —$CH_3$ | -sec-$C_4H_9$ |
| 113 | 2-$SO_3H$ | —$CH_3$ | —$CH_3$ | —$CH_3$ | -tert-$C_4H_9$ |
| 114 | 2-$SO_3H$ | —$CH_3$ | —$CH_3$ | —$CH_3$ | -cyclo-$C_6H_{11}$ |
| 115 | 4-$SO_3H$ | —$C_2H_5$ | —H | —$CH_3$ | —H |
| 116 | 2-$SO_3H$ | —$CH_3$ | —$CH_3$ | —H | —$C_2H_5$ |
| 117 | 3-$SO_3H$ | —$CH_3$ | —H | —H | Phenyl |

EXAMPLES 118 TO 125

The procedure described in Example 1 is repeated, except that if desired, an equimolar amount of one of the amines listed in Table 2 below in column 2 in the form of the free acid is used instead of 37 parts of 3-($\beta$-hydroxypropoxy)-4-aminoazobenzene-3'-sulfonic acid, if desired, an equimolar amount of a coupling component of the formula (5a), in which $R_1$ and $R_2$ are as defined in columns 3 and 4, is used instead of 14 parts of 2,4-pentanedione, and, if desired, an equimolar amount of the compound of the formula (7), in which $R_3$ is as defined in column 5, is used instead of 1.2 parts of hydrazine hydrate, giving analogous dyes which dye synthetic and natural polyamide fibre materials in golden-yellow or orange hues.

TABLE 2

| Ex. | Amine | $R_1$ | $R_2$ | $R_3$ |
|---|---|---|---|---|
| 118 | 3-sulfophenyl-N=N-[4-NH₂-2-CH₃-5-(OCH₂CH(CH₃)OH)phenyl] | —CH₃ | —CH₃ | —H |
| 119 | 4-sulfophenyl-N=N-[4-NH₂-2-CH₃-5-(OCH₂CH(CH₃)OH)phenyl] | —CH₃ | —CH₃ | —H |
| 120 | 4-sulfophenyl-N=N-[4-NH₂-2-CH₃-5-(OCH₂CH(CH₃)OH)phenyl] | —CH₃ | —CH₃ | —C₂H₅ |
| 121 | 3-sulfophenyl-N=N-[4-NH₂-2-CH₃-5-(OCH₂CH(C₂H₅)OH)phenyl] | —CH₃ | —CH₃ | —H |
| 122 | 2-chloro-5-sulfophenyl-N=N-[4-NH₂-2-CH₃-5-(OCH₂CH(C₂H₅)OH)phenyl] | —CH₃ | —CH₃ | —H |
| 123 | 3-sulfophenyl-N=N-[4-NH₂-2-Cl-5-(OCH₂CH(CH₃)OH)phenyl] | C₂H₅ | C₂H₅ | —H |
| 124 | 4-sulfophenyl-N=N-[4-NH₂-2-NHCOCH₃-5-(OCH₂CH(CH₃)OH)phenyl] | C₂H₅ | C₂H₅ | —H |

TABLE 2-continued

| Ex. | Amine | $R_1$ | $R_2$ | $R_3$ |
|---|---|---|---|---|
| 125 | 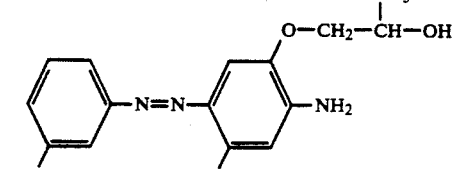 | $C_2H_5$ | $C_2H_5$ | —H |

DYEING EXAMPLE 1

10 parts of nylon 6.6 fibre material (Helanca knitted fabric) are dyed in 500 parts of an aqueous liquor which contains 2 g/l of ammonium acetate and is brought to a pH of 5 with acetic acid. The dyes used are 0.05% of the red dye which, in the form of the free acid, has the formula

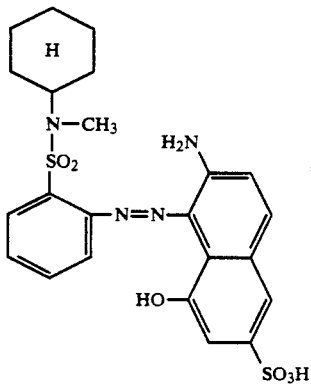

(102)

0.18% of the yellow dye which, in the form of the free acid, has the formula (101) and 0.17% of the blue dye which, in the form of the free acid, has the formula

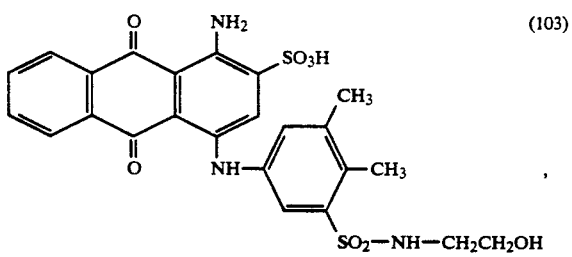

(103)

the amounts given being based on the fibre weight.

The dyeing time at a temperature of 98° is 30 to 90 minutes. The dyed polyamide fibre material is then removed from the liquor and rinsed and dried as usual, giving a piece of fabric which has been dyed completely levelly in a brown hue and does not have any material-related barriness.

DYEING EXAMPLE 2

10 parts of nylon 6.6 yarn are dyed in 400 parts of an aqueous liquor which contains 1.5 g/l of ammonium acetate and is brought to a pH of 5.5 with acetic acid. The dyes used are 0.13% of the yellow dye obtained according to Example 65, 0.1% of the dye of the formula (102) and 0.12% of the dye of the formula (103), the amounts given being based on the fibre weight. The dye bath is heated to 98° C. over a period of 30 minutes and maintained at 96° to 98° for 60 minutes. The dyed yarn is then removed and rinsed and dried as usual, giving a yarn dyed in a brown hue.

DYEING EXAMPLE 3

10 parts of nylon 6.6 carpet yarn are dyed in 400 parts of an aqueous liquor which contains 1.5 g/l of ammonium acetate and is brought to a pH of 5.5 with acetic acid. The dyes used are 0.15% of the red dye of the formula

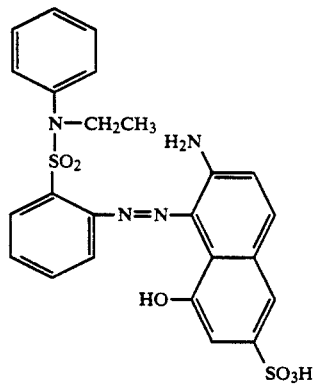

(104)

0.625% of the yellow dye obtained according to Example 119 and 0.52% of the blue dye of the formula (103), the amounts given being based on the fibre weight. The dye bath is heated to 98° over a period of 30 minutes and maintained at 96° to 98° for 60 minutes. The dyed yarn is then removed and rinsed and dried as usual, giving a yarn dyed in a brown hue.

DYEING EXAMPLE 4

The procedure described in Dyeing Example 3 is repeated, except that 0.32% of the dye of the formula (102) and 0.61% of the dye of the formula (103) are used instead of the dyes of the formulae (104) and (103), likewise giving a yarn dyed in a brown hue.

DYEING EXAMPLE 5: (CARPET PRINTING)

A nylon 6 velour carpet having a pile weight of 400 g/m² is padded, for ground shade, with an aqueous padding liquor of the following composition 0.1 g/l of the dye of the formula (101),
0.1 g/l of the dye of the formula (103),
2 g/l of a thickener based on natural polysaccharides,
0.5 g/l of a wetting agent based on a sulfated alkylarylpolyglycolate, and
0.5 g/l of an antifoam based on high-boiling alcohols, which has been brought to a pH of 4.5 with acetic acid, and squeezed off to a liquor pickup of 80%. A pattern is applied to the carpet thus pretreated via a printing screen using the following aqueous printing paste:

1 g/l of the dye of the formula (101),
20 g/l of the dye of the formula (102),
10 g/l of the dye of the formula (103),
15 g/l of a thickener based on natural polysaccharides,
2 g/l of a wetting agent based on a sulfated alkylarylpolyglycolate,
1 g/l of an antifoam based on high-boiling alcohols.

The printing paste has been brought to a pH of 4.5 with acetic acid.

The printed material is then treated with saturated steam at 101° for 5 minutes in order to fix the dyes, rinsed, neutralised, rinsed again and dried.

This gives a velour carpet having a bordeaux-coloured pattern on a pale olive ground shade having very sharp contours, good penetration and no frosting whatsoever.

DYEING EXAMPLE 6: (CONTINUOUS CARPET DYEING)

2.7 parts of the yellow dye of the formula (101), 1.2 parts of the red dye of the formula (102) and 1.3 parts of the blue dye of the formula (103) are dissolved in 100 parts of water by boiling for a short time. This solution is then added to a solution containing 3 parts of a thickener based on carbob seed flour, 5.0 parts of a coacervate-forming padding auxiliary based on a condensation product of a high-molecular-weight fatty acid with a hydroxyalkylamine, 2.0 parts of crystalline monosodium phosphate and 1.0 part of crystalline disodium phosphate in 500 parts of cold water. The mixture is then made up to 1000 parts with cold water. 300%, relative to the carpet weight, of this liquor having a pH of 5.5 to 6.5 are applied to an untreated nylon 6.6 needle-pile carpet at a carpet rate of 8 meters per minute. The impregnated carpet enters a loop steamer, where it is treated with saturated steam at 98° to 100° for 10 minutes.

After washing in a broad washing machine, a carpet dyed in a neutral brown hue is obtained.

What is claimed is:

1. An azo dye of the formula

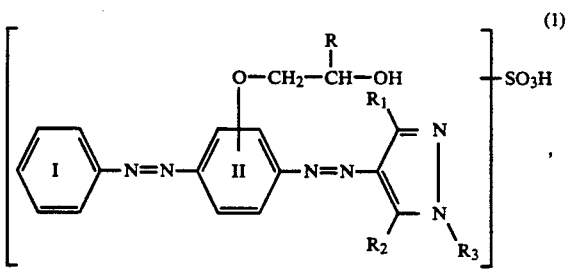

in which R, $R_1$ and $R_2$, independently of one another, are hydrogen, substituted or unsubstituted $C_1$-$C_8$alkyl or phenyl, $R_3$ is hydrogen or substituted or unsubstituted $C_1$-$C_8$alkyl, $C_5$-$C_7$cycloalkyl or phenyl and the benzene rings I and II may be further substituted.

2. An azo dye according to claim 1, wherein R is hydrogen or unsubstituted or hydroxyl-substituted $C_1$-$C_4$alkyl.

3. An azo dye according to claim 1, wherein $R_1$ and $R_2$, independently of one another, are hydrogen, phenyl or $C_1$-$C_4$alkyl.

4. An azo dye according to claim 1, wherein $R_3$ is hydrogen, $C_1$-$C_4$alkyl or phenyl.

5. An azo dye according to claim 1, wherein the benzene rings I and II, independently of one another, may be further substituted by $C_1$-$C_4$alkyl, $C_1$-$C_4$alkoxy, $C_2$-$C_4$alkanoylamino or halogen.

6. An azo dye according to claim 1, wherein the sulfo group is bound to the benzene ring I.

7. An azo dye according to claim 1, wherein R is hydrogen or unsubstituted or hydroxyl-substituted $C_1$-$C_4$alkyl, $R_1$ and $R_2$, independently of one another, are hydrogen or $C_1$-$C_4$alkyl, $R_3$ is hydrogen, $C_1$-$C_4$alkyl or phenyl, the benzene rings I and II, independently of one another, may be further substituted by $C_1$-$C_4$alkyl, $C_1$-$C_4$alkoxy, $C_2$-$C_4$alkanoylamino or halogen, and the sulfo group is bound to the benzene ring I.

8. An azo dye according to claim 1 of the formula

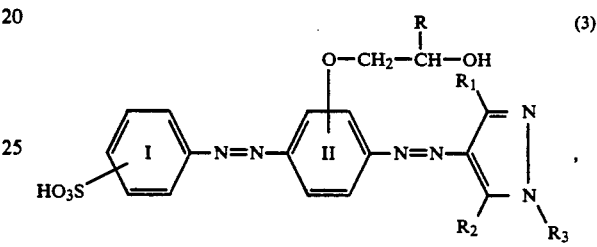

in which R is methyl or ethyl, $R_1$ and $R_2$, independently of one another, are methyl or ethyl, $R_3$ is hydrogen, methyl, ethyl or phenyl and the benzene rings I and II, independently of one another, may be further substituted by methyl, methoxy, acetylamino or chlorine.

9. An azo dye according to claim 2, wherein $R_1$ and $R_2$ is methyl or ethyl.

10. An azo dye according to claim 3, wherein R is methyl or ethyl.

11. A process for the trichromatic dyeing or printing of natural and synthetic polyamide fibre materials using dye mixtures, which comprises applying to a polyamide fibre material at least one yellow- or orange-dyeing dye of the formula

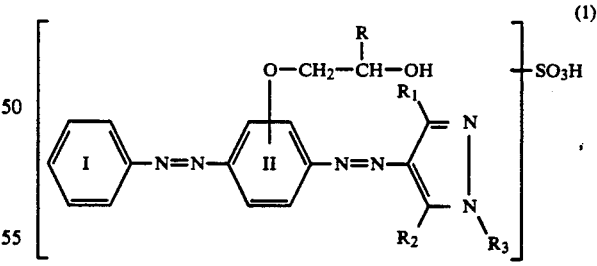

in which R, $R_1$ and $R_2$, independently of one another, are hydrogen, substituted or unsubstituted $C_1$-$C_8$alkyl or phenyl, $R_3$ is hydrogen or substituted or unsubstituted $C_1$-$C_8$alkyl, $C_5$-$C_7$cycloalkyl or phenyl, and the benzene rings I and II may be further substituted, together with at least one red-dyeing dye and at least one blue-dyeing dye.

12. A process according to claim 11 for the trichromatic dyeing or printing, which comprises applying to a polyamide fibre material at least one of the red-dyeing dyes of the formulae (9), (10) and (11):

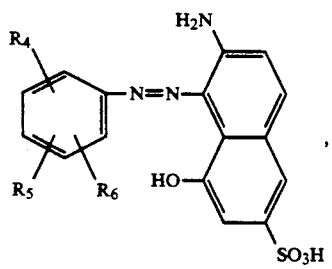

(9)

in which $R_4$ is substituted or unsubstituted $C_1$-$C_8$alkyl, halogen, phenylsulfonyl or phenoxysulfonyl which is unsubstituted or substituted in the phenyl ring by $C_1$-$C_4$alkyl, or is cyclohexyloxycarbonylamino, $C_2$-$C_4$alkanoylamino, benzoylamino which is unsubstituted or substituted in the phenyl ring by halogen, or is 1-azacycloheptane-N-sulfonyl or

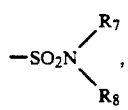

in which $R_7$ is $C_1$-$C_8$alkyl or unsubstituted or $C_1$-$C_4$-alkyl-substituted phenyl or cyclohexyl and $R_8$ is hydrogen or $C_1$-$C_8$alkyl, $R_5$ is hydrogen, halogen, $C_1$-$C_8$alkyl or $C_2$-$C_4$alkanoylamino and $R_6$ is hydrogen or halogen,

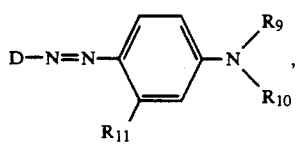

(10)

in which D is substituted or unsubstituted phenyl, thiophenyl or benzothiazolyl, $R_9$ is $C_1$-$C_8$alkyl, $R_{10}$ is substituted or unsubstituted $C_1$-$C_8$alkyl and $R_{11}$ is hydrogen or $C_1$-$C_4$alkyl, and

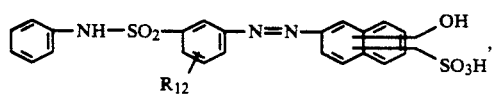

(11)

in which $R_{12}$ is $C_1$-$C_4$alkyl, together with at least one blue-dyeing dye of the formula

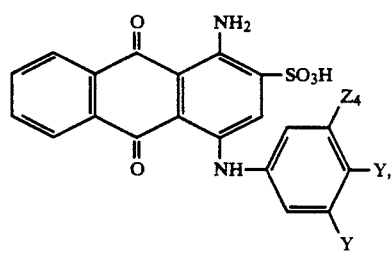

(12)

in which one Y is hydrogen or methyl and the other Y is $C_2$-$C_4$alkanoylamino or $C_2$-$C_4$hydroxyalkylsulfamoyl, and $Z_4$ is hydrogen or methyl.

13. A process according to claim 11 for trichromatic dyeing or printing, which comprises applying to a polyamide fibre material at least one of the red-dyeing dyes of the formulae

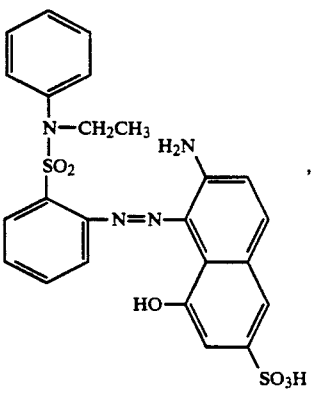

(13)

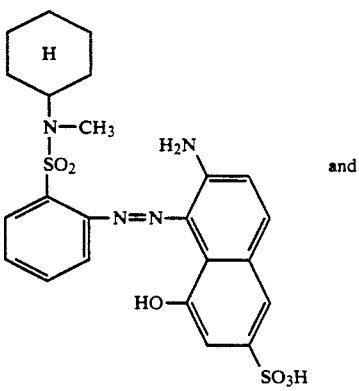

(14)

and

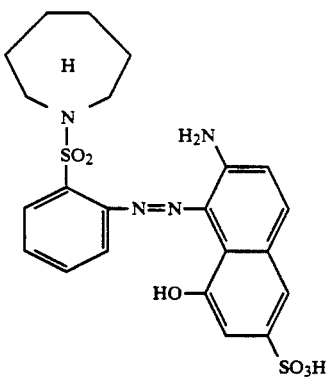

(15)

together with at least one of the blue-dyeing dyes of the formulae

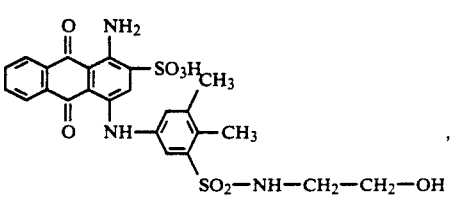

(16)

-continued
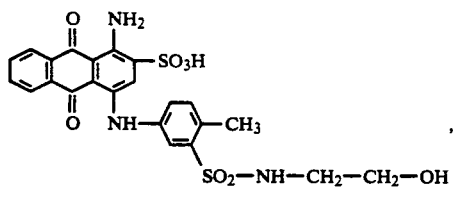
(17)
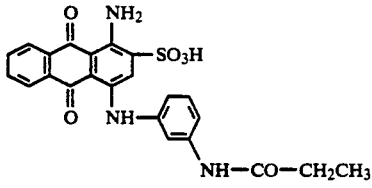
(19)
and
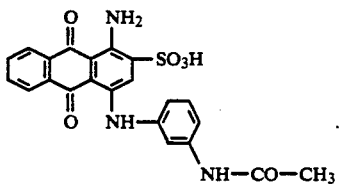
(20)
14. A polyamide fibre material dyed or printed by the process according to claim 11.
15. A polyamide fibre material according to claim 14, wherein said fibre material is a polyamide carpet.
* * * * *